E. P. DU PONT.
CLUTCH CONTROL FOR MULTIPROPELLER MOTOR BOATS.
APPLICATION FILED MAY 19, 1917.
1,247,799.
Patented Nov. 27, 1917.
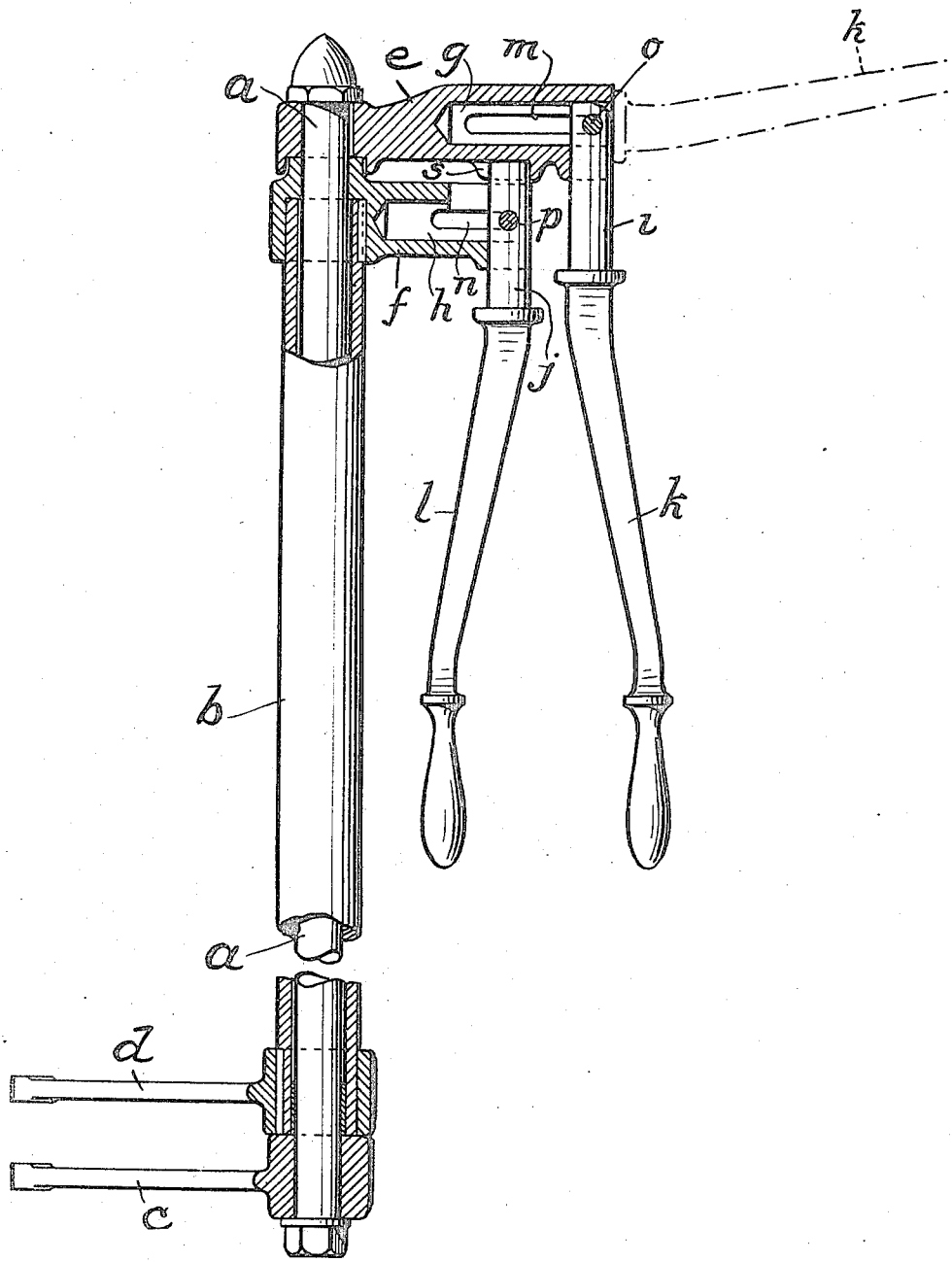
WITNESS:
Rob R Kitchel
INVENTOR
Eleuthere Paul du Pont
BY
Frank S. Busser
ATTORNEY.

UNITED STATES PATENT OFFICE.

ELEUTHERE PAUL du PONT, OF MONTCHANIN, DELAWARE.

CLUTCH CONTROL FOR MULTIPROPELLER MOTOR-BOATS.

1,247,799.  Specification of Letters Patent.  Patented Nov. 27, 1917.

Application filed May 19, 1917. Serial No. 169,694.

*To all whom it may concern:*

Be it known that I, ELEUTHERE PAUL DU PONT, a citizen of the United States, residing at Montchanin, county of New Castle, and State of Delaware, have invented a new and useful Improvement in Clutch Control for Multipropeller Motor-Boats, of which the following is a full, clear, and exact description, reference being had to the accompanying drawings, which form a part of this specification.

Heretofore it has been customary to lead the engine clutch control, in motor boats, to the pilot house, forming what is popularly known as a one man boat. However, in boats having more than one propeller, the task of controlling the propellers and steering the boat becomes very complicated. For example, when it is desired to stop, the steering wheel must be released and the clutches of both propellers pulled simultaneously. Nevertheless, the multi-propellered boat has many advantages and it is desirable that the propellers be readily controlled independently as, for example, in a twin screw boat, in the execution of various maneuvers it is found beneficial to drive forward on one propeller, while the other is reversed or stationary.

The object of my invention is to provide a device whereby a plurality of propellers may be controlled either independently or as a unit, at the will of the operator.

Referring to the accompanying drawings, in which a preferred embodiment of my invention, for the control of a twin propellered boat, is illustrated:

The single figure is an elevation of my device partly in section.

The rocker shafts $a$ and $b$, one within the other, are connected to the clutches of a twin propellered boat through the rockers arms $c$ and $d$ respectively.

The hubs $e$ and $f$ are fastened to the ends of, and turnable with, the shafts $a$ and $b$ respectively, and are provided with the sockets $g$ and $h$ adapted to receive the shanks $i$ and $j$ of the levers $k$ and $l$. One of the walls of each of the sockets is provided with a slot $m$ and $n$, the slot $n$ in the wall of the socket $h$ being relatively shorter than the slot $m$. The pins $o$ and $p$, on the shanks $i$ and $j$ of the levers, are adapted to engage and slide in the slots $m$ and $n$. The slots and pins act to guide the levers and to maintain them rigidly connected to the hubs, when in lowered position.

The hub $f$ is made somewhat shorter than the hub $e$ and the wall of the socket $h$, adjacent to the hub $e$, is cut down. The pin $p$ in the shank $j$ is set back from its end, so that when the lever $l$ is in lowered position the end of the shank $j$ will extend beyond the outer edge of the hub $f$ toward the hub $e$.

On the side of the hub $e$, adjacent to the hub $f$, is placed the socket $s$ adapted to receive the end of the shank $j$, when the lever $l$ is in lowered position, and lock the lever to the hub $e$, which results in locking the two hubs together since the lever is maintained rigidly connected with the hub $f$ by its pin $p$.

In practice, when it is desired to control each of the propellers independently, both of the levers $k$ and $l$ are raised and seated in their respective sockets in the hubs $e$ and $f$ which in turn, as described, are fastened to, and turnable with, the shafts $a$ and $b$. The hubs and shafts may now be moved independently by means of the levers, and if desired while one lever is set to go ahead the other may be pulled to stop or reverse, and vice versa.

If it is now desired to control both propellers as a unit, it is only necessary to withdraw lever $l$ from its socket and lower it from the horizontal position to the position shown in the figure, which will raise the end of its shank $j$ into the socket $s$ and lock the hub $f$ to the hub $e$.

It may now be readily seen that since the two hubs are locked together, both of the shafts may be controlled simultaneously by the lever $k$, which is in its normal working position, shown in broken lines.

Having now fully described my invention, what I desire to claim and protect by Letters Patent is:

1. Means for controlling multi-propeller motor boats, comprising two independent clutch-operating devices, actuating levers connected with the respective clutch-operating devices, and means compelling the operation of said devices by one of said levers when the other lever is in its inoperative position, said means being rendered inoperative by the movement of the last named lever into operative position.

2. Means for controlling multi-propeller motor boats, comprising two independent clutch-operating devices, actuating levers connected with the respective clutch-operating devices and movable into and out of operative position, said levers, when both are in operative position, being operable to independently operate their respective clutch-controlling devices, one of said levers when in inoperative position adapted to lock said clutch-shifting devices together to permit the operation of both of them by the other lever.

3. Means for controlling multi-propeller motor boats, comprising a plurality of independent clutch-operating devices, actuating levers, one connected with each clutch-operating device and movable into and out of position to independently actuate the same, and connecting means between one of said levers, when in inoperative position, and the device controlled by another lever to lock together the two devices, whereby both devices may be actuated in unison from the last named lever.

4. Means for controlling multi-propeller motor boats, comprising a plurality of independent clutch-operating devices each including a turnable hub, a lever pivotally mounted on each hub and swingable into and out of position for hand operation, one of said levers, when in inoperative position for hand operation, affording a locking connection between its own hub and the hub of the other lever, and when in operative position for hand operation disrupting said locking connection, whereby each clutch-operating device may be operated independently by its own lever or both clutch-operating devices operated by one of said levers.

5. Means for controlling multi-propeller motor boats, comprising a plurality of independent clutch-operating devices, one including a shaft and hub and the other including a hub and a sleeve on said shaft, each hub being recessed and slotted in a direction radial of the axes of said shaft and sleeve, a lever pivotally mounted on each hub, said pivotal mounting including a pin slidable in the slot of the hub, whereby each lever may be swung on its pivot and moved in the direction of its length to seat it in the recess of its hub and thereby rendered operative for hand operation, one of said levers, when in inoperative position for hand operation, engaging both hubs so as to lock them together, thereby permitting both hubs to be operated by the other lever.

In testimony of which invention, I have hereunto set my hand, at Montchanin, Delaware, on this 5th day of May, 1917.

ELEUTHERE PAUL DU PONT.

Copies of this patent may be obtained for five cents each, by addressing the "Commissioner of Patents, Washington, D. C."